July 10, 1945.    R. S. DRUMMOND    2,380,224
HERRINGBONE GEAR FINISHING
Filed March 25, 1940

INVENTOR.
ROBERT S. DRUMMOND
BY Whittemore, Hulbert
& Belknap
ATTORNEYS

Patented July 10, 1945

2,380,224

UNITED STATES PATENT OFFICE 2,380,224

HERRINGBONE GEAR FINISHING

Robert S. Drummond, Detroit, Mich.

Application March 25, 1940, Serial No. 325,861

8 Claims. (Cl. 90—1.6)

The present invention relates to gear manufacture and more specifically to the production of herringbone gears having accurately finished surfaces adapted to run in mesh without crotch interference. Herringbone gears having continuous teeth are at present manufactured by a shaper method, but it has previously been considered impossible to finish these teeth to anything like the degree of accuracy available for ordinary spur or helical gears. Continuous teeth are much preferred over the type having a slot, or the so-called "double helical" because they are much stronger and more rigid. It is neither necessary nor desirable to have actual contact between the point of one tooth and the crotch of the adjacent tooth of a mating herringbone gear. The shaper provides roughly accurate gear teeth, but certain errors are inherent in this type of manufacture. According to the present invention I have adapted my crossed axes gear shaving to the finishing of herringbone gears. The method may be practiced to provide accurately finished uncrowned herringbone gears which are adapted to have contact from the free ends thereof to a point closely adjacent to the crotch. The method is also adapted to provide herringbone gear teeth having crotch clearance and crowned so as to avoid end contact. The method takes two specific forms: In the first the teeth of the herringbone gear are initially formed in the shaper operation so as to have substantial crotch clearance. Thus, for example, the teeth may be formed off-lead so as to have .002 inch clearance at the crotch. These teeth may then be finished by my crossed axes finishing method for a certain distance from the ends of the teeth toward the crotch thereof. If this finishing action is continued from the end of the teeth to near the crotch, the teeth will have accurate quiet contact throughout this range, and at the same time there will remain adequate crotch clearance. Instead of finishing the teeth so as to have substantially uniform contact from the end to the point intermediate the end and the crotch, this surface may be crowned somewhat so as to avoid end contact between the teeth of mating herringbone gears.

As a second embodiment of my invention, the teeth of the herringbone gear may initially be formed without modification, that is, non-tapered and of uniform lead from end to end. To finish herringbone gears of this type, I provide a modified cutter which is a gear-like tool having cutting edges extending generally up and down the faces of the teeth.

In order to finish the teeth of the herringbone gear in a manner to remove metal from the point of the teeth so as to provide crotch clearance, I modify one corner of the teeth of the cutter. This modification consists in removing a substantial portion of the teeth at one corner thereof. This cutter is then placed in mesh with a herringbone gear, with the relieved corner of the cutter tooth adjacent the crotch of the herringbone teeth. By this means I am enabled to machine the point side of the herringbone teeth of the gear up to the point. By imparting a crowning motion to the gear and cutter, preferably about an axis parallel to the common normal to the axes of the gear and cutter, I remove a substantial amount of metal from the point of the herringbone teeth. At the same time I shave the crotch side of the teeth from the end to a point intermediate the end and the crotch of the herringbone gear. On the point side of the herringbone gear teeth metal is removed from the point of the tooth and for a substantial distance adjacent the point. The operation of course is repeated for each side of the herringbone gear. After the point of the herringbone gear has been machined, it is possible, if preferred, to machine a substantial amount of the ends of the teeth of the herringbone gear uniformly, although the operation previously described results in crowned teeth which will avoid end interference.

It is accordingly an object of the present invention to produce herringbone gears having continuous shaved bearing surfaces.

It is a further object of the present invention to provide herringbone gears having crowned teeth.

It is a further object of the present invention to finish herringbone gears with a modified cutter avoiding crotch contact.

It is a further object of the present invention to shave herringbone gears, by meshing the herringbone gear with a gear-like shaving tool, and providing a relative oscillation between the gear and tool about an axis parallel to the common normal to the axes of the gear and tool, while providing a slight relative reciprocation.

Other objects of the invention will be apparent as the description proceeds, and when taken in conjunction with the accompanying drawing wherein.

Figure 1:
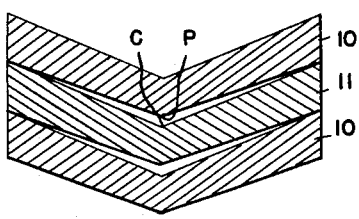
Figure 1 is a diagrammatic view illustrating the contact between teeth of herringbone gears before finishing when made in accordance with one aspect of the present invention.

Referring first to Figure 1, I have illustrated the relationship between the teeth of a pair of mating herringbone gears having tapered teeth. This figure is intended to show the contact between the gear teeth and may be considered as a fragmentary section through the mating teeth taken substantially at the pitch diameter. In this figure the teeth 10 of the one herringbone gear contact adjacent the ends with teeth 11 of the other herringbone gear. The teeth, as indicated, are tapered so that substantial clearance exists between the point P of the teeth 10 and crotch C of the teeth 11.

Figure 2:
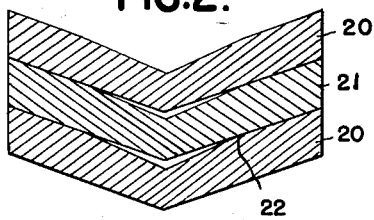
Figure 2 is a diagrammatic view similar to Figure 1, illustrating the contact between the teeth of herringbone gears after the same have been finished according to the present invention.

The difficulty previously encountered in attempting to finish herringbone gears lay in the fact that it was impossible to contact a half tooth of the herringbone gear clear up to the point and crotch thereof without encountering interference with the other half of the tooth on the crotch side. According to the present invention a cutter, such as the cutter T in Figure 6, may be meshed with one-half of the herringbone gear G and the parts rotated in mesh. Preferably the crossed axes relationship between the gear and cutter is very slight, and by this means it is possible to shave both sides of a half tooth up to a point relatively close to the point-crotch of the tooth. This operation is of course repeated on both halves of the herringbone teeth with the result that a pair of shaved herringbone gears will mesh as shown in Figure 2. In this figure the teeth 20 of the one herringbone gear contact teeth 21 of the other herringbone gear from the ends thereof to a point 22 which is located relatively close to the mid portion of the herringbone gear.

The clearance which initially exists between the point of one tooth and the crotch of the next adjacent tooth is reduced to a fraction of the initial amount. Thus for example, if each half tooth of the herringbone gear is shaved from its ends to a point midway between the end and point-crotch thereof, the initial clearance will be reduced about half.

The shaving operation employed in this method is preferably accompanied by a limited relative translation between the gear and cutter in a plane parallel to the axes of both the gear and cutter. This results in unmodified teeth which will contact uniformly throughout their shaved extent.

Figure 6:
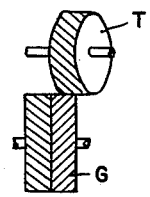
Figure 6 is a diagrammatic side elevation illustrating the relationship between the herringbone gear and the cutter.

In some cases it is preferable to provide the teeth of the herringbone gear with end clearance in addition to crotch clearance, and this is accomplished by imparting a crowning motion to the gear and cutter when contacted in the relationship illustrated in Figure 6.

Figure 7:
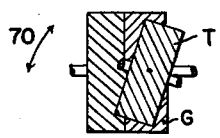
Figure 7 is a diagrammatic plan view of Figure 6.

In Figure 7 I have illustrated a relative crowning motion between the gear and cutter as an oscillation in the direction of the arrow 70 about the common normal to the axes of the gear and cutter. This results in removing metal from the ends of the gear teeth and shifting the contact between mating herringbone teeth to the zone intermediate the ends of the teeth and the point-crotch thereof. The crowning may result from other relative motions, as for example a rocking about an axis transverse to the axis of the gear, and in a plane parallel to both the axes of the gear and cutter, as shown in my prior Patent No. 2,157,981.

Figure 3:
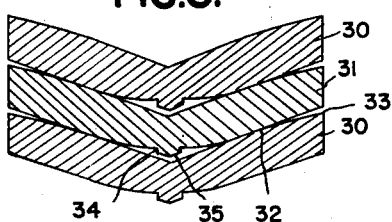
Figure 3 is a diagrammatic view similar to Figure 2, illustrating the contact between teeth of herringbone gears when crowned according to the present invention.

In Figure 3 I have illustrated the contact between teeth of mating herringbone gears finished according to this last method. In this figure I have illustrated the teeth 30 of the one herringbone gear as contacting the teeth 31 of the other herringbone gear centrally at a zone indicated at 32. End contact is avoided due to the crowning of the teeth previously defined, as indicated at 33 in this figure. This crowning motion has the effect of forming notches 34 at the point side of the herringbone teeth, but this is immaterial since substantial clearance exists between the point of one herringbone tooth and the crotch of the other, as indicated at 35.

The foregoing methods depend upon the initial formation of the herringbone gear so as to have off-lead or tapered teeth providing initial clearance at the mid-portion thereof. I have further devised a method for accurately shaving the work surface of the herringbone teeth which are initially unmodified.

Figure 4:
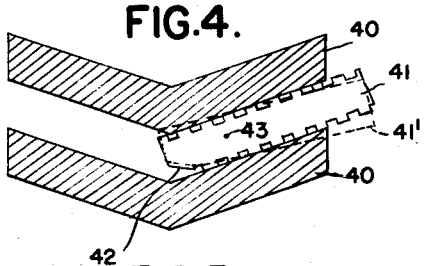
Figure 4 is a diagrammatic view illustrating the relationship between a herringbone gear and a modified cutter.

Referring now to Figure 4, I have illustrated teeth 40 of a herringbone gear as contacted by a tooth 41 of a modified cutter. The cutter tooth 41 has one corner thereof removed or relieved as indicated at 42. This is the corner of the cutter tooth which would otherwise interfere with the other half of the herringbone tooth during the shaving operation. As indicated in Figure 4, by employing a cutter of this type I can machine the point side of the herringbone teeth from one end thereof clear up to the point. It will be appreciated that a cutter having the cutter tooth 41 illustrated in Figure 4 is operated in mesh at crossed axes with the herringbone gear having the teeth 40. The two parts are rotated, and due to the crossed axes relationship a slippage occurs between the teeth of the gear and cutter longitudinally thereof. I have indicated at 43 the center of crossed axes between the gear and cutter, and in order to remove material from the point of the teeth 40, a relative oscillation between the gear and cutter is provided, preferably about the common normal to the axes of said gear and cutter. I have indicated in dotted lines at 41' the position assumed by the cutter tooth 41 when this relative oscillation takes place, and it will be observed that material is removed from the point of the herringbone teeth and at the same time metal is removed from the ends of the herringbone teeth at the crotch side thereof.

This finishing operation shaves the working surfaces of the herringbone teeth and at the same time relieves the point of the teeth so that point-crotch interference is avoided. At the same time it crowns the teeth a desired amount. The oscillation is preferably limited between the full line position and the dotted line position in Figure 4, and the crowning is effected by removing metal from the point side of the herringbone teeth at the point thereof and from the crotch side of the herringbone teeth at the free ends thereof. If desired, the oscillation may be carried also in the other direction, which will remove metal from the ends of the herringbone teeth on the point side, and some metal from the crotch side of the herringbone teeth adjacent but not extending to the center.

It is also possible, as will be evident, to control the amount of metal removed from the respective surfaces by shifting the center of crossed axes 43. Thus, for example, if the center of crossed axes is adjacent the free ends of the herringbone teeth, the oscillation will result in the removal of more metal from the point of the teeth than from the free end of the crotch side of the teeth. Where this is the case, it is then possible, if desired, to machine the herringbone teeth from their free ends to a point substantially adjacent the mid portion thereof uniformly as opposed to providing a crowning formation thereto.

Figure 9:
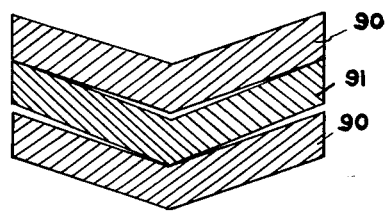
Figure 9 is a diagrammatic view illustrating the contact between teeth of herringbone gears in off-lead relation before finishing.

Herringbone gears initially formed off-lead may also be finished in this manner. I have illustrated in Figure 9 the relationship between the teeth 90 of one herringbone gear with a tooth 91 of another, in which the tooth 91 contacts one adjacent tooth at the corner and the other at the center. The teeth 91 may be shaved to relieve the points and the outside corners on the crotch side may be shaved to correct lead to the same lead as the mating gear.

Figure 5:
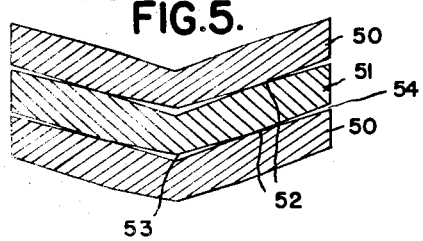
Figure 5 is a diagrammatic view illustrating the contact between a pair of herringbone gears when finished with the modified cutter illustrated in Figure 4.

In Figure 5 I have illustrated teeth of meshing herringbone gears as finished by the operation illustrated in Figure 4. In this figure the teeth 50 of one herringbone gear contacts the teeth 51 of the other herringbone gear at zones indicated at 52, which may be substantially midway between the ends of the teeth and the mid-portion thereof. Point-crotch clearance is provided as indicated at 53, and end contact is avoided, clearance being provided as indicated at 54.

It will be evident that if desired only one of a pair of mating herringbone gears may be finished and the effect of crowning obtained. However, in addition to providing a desired bearing between the ends of each half of a tooth the surface finish imparted by my method materially improves the operation of the gears in use.

Figure 8:
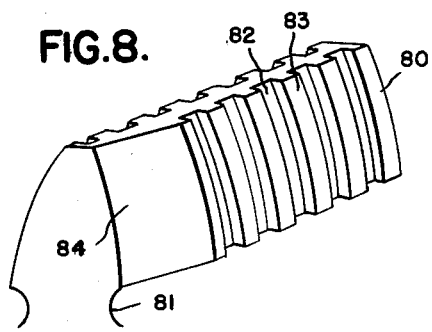
Figure 8 is a perspective of the modified cutter tooth.

In Figure 8 I have illustrated in perspective a tooth of the cutter adapted to perform the operation illustrated in Figure 4. This is a single cutter tooth and will be of such helix angle relative to the helix angle to the halves of the herringbone gear that it will mesh therewith at a very small crossed axes relation.

The tooth 80 is provided with under-cuts 81 which provide for ready chip disposal, and in addition the faces of the teeth are provided with grooves or serrations 82. These serrations 82 leave intermediate upstanding lands 83 which have cutting corners. In order to prevent interference between the tooth 80 and the opposite half of the herringbone tooth in mesh therewith, tooth 80 has one corner removed, as indicated at 84. In relieving the corner as indicated at 84, consideration must be given, of course, to leave sufficient material to support the corner directly opposite, and the relieved portion 84 will normally extend for a distance sufficient only to provide the necessary clearance at the crotch of the herringbone gear teeth. It will be evident, of course, that if the relieved portion is carried back for an excessive distance, the crotch side of the herringbone teeth will not be finished as close as desirable to the crotch.

By the present methods I have for the first time made it possible to provide herringbone gears having continuous teeth whose working surfaces are accurately machined. The crossed axes shaving of ordinary spur or helical gears have resulted in such quiet and efficient operation of this type of gears that herringbone gears have not been used as widely as their merits justify. An important reason for this is that, as previously stated, it has been impossible to finish the surfaces of these teeth to anything like the degree of accuracy and quiet operation available for the ordinary spur or helical gears. By the present invention it is possible to finish the working surfaces of the herringbone gears so that quiet and efficient operation results.

Basically the present method may be said to be distinguished by the provision of crotch-point clearance followed by, or accompanied with, accurate finishing of the surfaces of the teeth from the ends thereof to closely adjacent the point-crotch of the teeth. In addition it is now possible to provide crowned herringbone teeth such that the contact between mating teeth is at a zone of desired width on each half of the gear teeth and spaced both from the point-crotch and the ends thereof. Thus point-crotch interference is avoided, and the undesirable end contact is also avoided.

While I have described my methods and product with considerable particularity, this has been done only to enable those skilled in the art to practice the invention, the scope of which is illustrated by the appended claims.

What I claim as my invention is:

1. The method of shaving the teeth of a herringbone gear which comprises providing a gear-like shaving cutter having teeth substantially relieved at one corner, meshing said gear and cutter so that said relieved corner provides crotch clearance while the opposite side of said cutter tooth machines the point side of the adjacent gear tooth completely to the point, rotating said gear and cutter in mesh, and relatively oscillating said gear and cutter about the common normal to their axes to remove material at and adjacent the point of said gear teeth.

2. The method of shaving the teeth of a herringbone gear which comprises providing a gear-like shaving cutter having teeth substantially relieved at one corner, meshing said gear and cutter so that said relieved corner provides crotch clearance while the opposite side of said cutter tooth machines the point side of the adjacent gear tooth completely to the point, rotating said gear and tool in mesh, and relatively oscillating said gear and tool about the common normal to their axes to remove material at and adjacent the point of said gear teeth and from the opposite side of said gear teeth adjacent the end thereof.

3. The method of shaving the teeth of a herringbone gear which comprises meshing a gear-like shaving cutter at limited crossed axes with the teeth at one side of said gear, said cutter having teeth relieved at the corner which would otherwise interfere with the crotch side of said gear teeth, rotating said gear and cutter, and providing a relative motion between said gear and cutter adapted to remove a maximum of material from the point side of said gear teeth adjacent the point thereof.

4. The method of making a herringbone gear having continuous teeth which comprises initially forming a gear with tooth surfaces of predetermined lead, and rotating in mesh and at crossed axes the gear and a gear-like cutter having teeth relieved at one corner to clear the portions of the surfaces of the teeth of the gear at the crotch, and during the rotation removing material from the portions of the teeth axially outwardly from the first mentioned portions and also material at the opposite sides of the teeth.

5. The method of making a herringbone gear having continuous teeth which comprises initially forming a gear with tapered teeth to provide clearance between the point and crotch portions of the surfaces of mating teeth of the gear and a second gear to be meshed with the first mentioned gear and running part of the first mentioned gear in mesh with a gear-like rotary cutter at crossed axes with the surfaces of the teeth of the cutter at an angle to the surfaces of the teeth of the part of the first mentioned gear to clear one of the point and crotch surface portions of the teeth of the first mentioned gear and meanwhile relatively translating the first mentioned gear and cutter in a plane parallel to the axis of one to remove material from the teeth axially outwardly from the last mentioned surface portion.

6. The method of making a herringbone gear having continuous teeth which comprises initially forming a gear with tapered teeth to provide clearance between the point and crotch portions of the surfaces of mating teeth of the gear and a second gear to be meshed with the first mentioned gear and running part of the first mentioned gear in mesh with a gear-like rotary cutter at crossed axes with the surfaces of the teeth of the cutter at an angle to the surfaces of the teeth of the part of the first mentioned gear to clear the point and crotch surface portions of the teeth of the first mentioned gear and meanwhile relatively translating the first mentioned gear and cutter in a plane parallel to their axes to remove material from the teeth axially outwardly from the last mentioned surface portions.

7. The method of making a herringbone gear having continuous teeth which comprises initially forming a gear with tooth surfaces of predetermined lead to provide substantial crotch clearance and rotating the gear and a gear-like cutter at crossed axes with a part of the gear in mesh with the cutter and with the surfaces of the teeth of the cutter at a different angle than the surfaces of the teeth of the part of the gear to clear portions of the surfaces of the teeth at the crotches and meanwhile relatively translating the gear and cutter in a plane parallel to the axis of one to remove material from the portions of the surfaces of the teeth spaced axially outwardly from the crotches of the teeth.

8. The method of making a herringbone gear having continuous teeth which comprises initially forming a gear with tooth surfaces of predetermined lead to provide substantial crotch clearance, rotating part of the gear and a gear-like cutter in mesh at crossed axes, relatively rocking the gear and cutter about an axis parallel to the common normal to the axes of the gear and cutter and limiting the relative rocking to compel the cutter to clear portions of the surfaces of the teeth of the gear at the crotches and remove material from the portions of the surfaces of the teeth spaced axially outwardly from the crotches of the teeth and also from the surfaces of the teeth at the opposite sides thereof.

ROBERT S. DRUMMOND.